United States Patent Office 3,391,051
Patented July 2, 1968

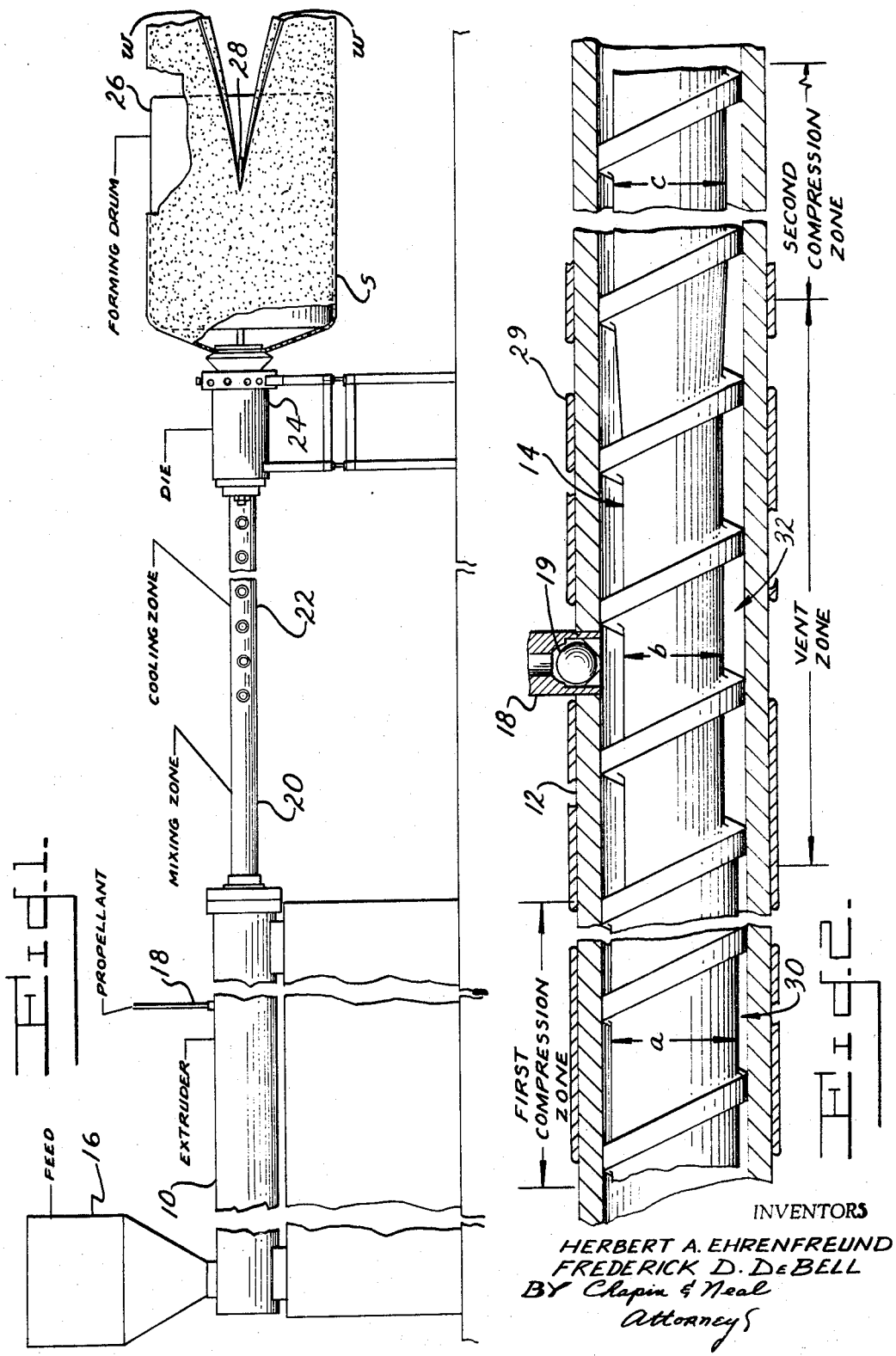

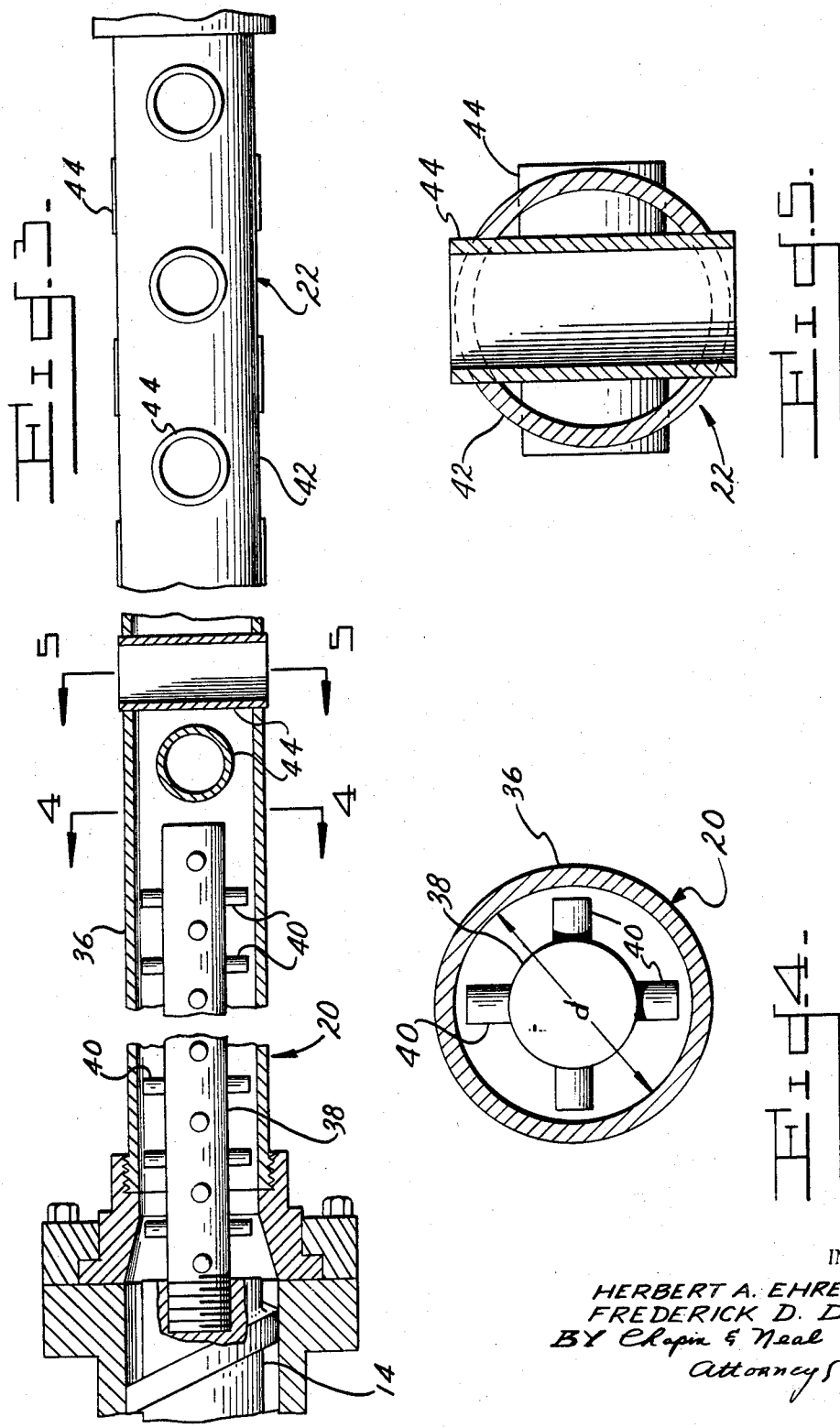

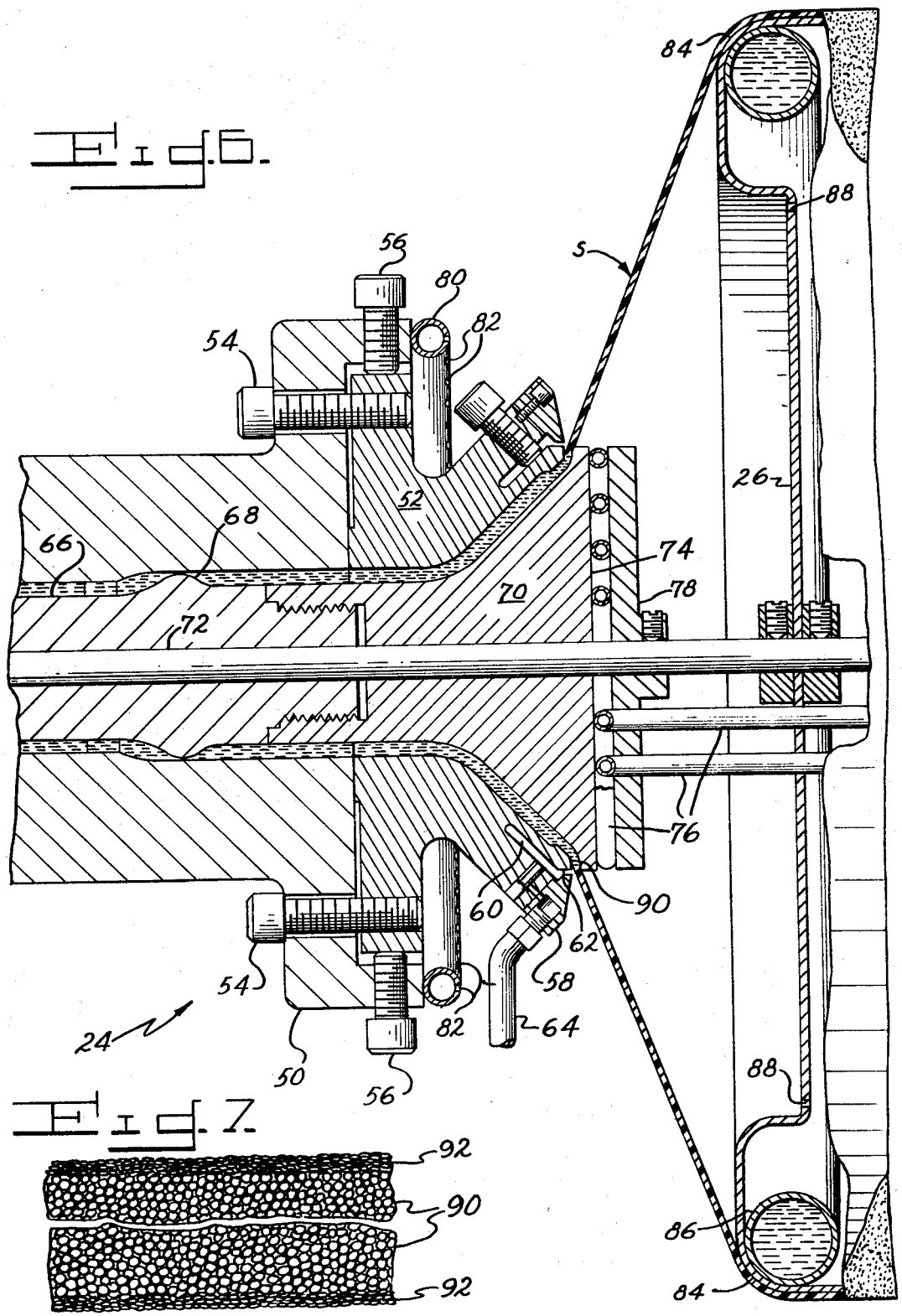

3,391,051
THERMOPLASTIC FOAM SHEET MATERIAL AND APPARATUS FOR THE MANUFACTURE THEREOF
Herbert A. Ehrenfreund, Longmeadow, Mass., and Frederick D. De Bell, Hazardville, Conn., assignors to De Bell & Richardson, Inc., Hazardville, Conn., a corporation of Connecticut
Filed Apr. 19, 1965, Ser. No. 449,178
6 Claims. (Cl. 161—164)

ABSTRACT OF THE DISCLOSURE

Apparatus for the manufacture of thermoplastic cellular foam sheet material wherein the surfaces of the sheet material have a higher density than the interior thereof, said apparatus being an extruder interconnected to a cooling and mixing low shear agitating zone, followed by a non-agitating cooling zone and a die. Said non-agitating cooling zone including a plurality of axially spaced tubes radially extending through the conduit forming the cooling zone for cooling and blending a polymer melt substantially without shear.

Background

This invention relates to the manufacture of thermoplastic foam sheet material, and is particularly concerned with the manufacture of high grade foam sheeting suitable for deep draw thermoforming.

While foam sheet material may be made from expandable polystyrene beads and can be extruded in conventional equipment, it has been found that high quality foams can be economically produced using general purpose thermoplastics but require precise temperature control in the extruder, at the die lip, and during generation of the foam.

In copending application Ser. No. 410,259, filed on Nov. 10, 1964, and assigned to the same assignee as the instant case, a sheet foam extrusion process is disclosed in which non-foamable thermoplastics, such as general purpose polystyrene, are used instead of the conventional foamable materials. In this process, the general purpose material is impregnated or premixed with a softening agent, such as petroleum ether, and then fed to an extruder. A suitable expanding agent, such as pentane, hexane, or heptane, is fed directly into the extruder where it is mixed with the polymer. By this method excessively high polymer temperatures and the necessity of drastic cooling before extruding the polymer were obviated and resulted in uniformly high quality thermoplastic foams. Moreover, in contrast with foamable particles, the quality of the foams produced was entirely independent of storage time or age of the thermoplastic charged to the extruder.

It was thus found that excellent foams could be produced by adjusting the melt flow of the polymer by means other than temperature, feeding the polymer to an extruder and mixing with an expanding agent in the extruder.

The principal object of this invention is to provide apparatus for making high quality thermoplastic foam sheet material in which the expanding agent is diffused in the polymer in the extruder.

It is a further object of this invention to provide novel extrusion and die apparatus for carrying out the process disclosed in the aforesaid copending application.

It is another object of this invention to provide improved thermoformable sheet material having one or more surfaces of higher density than the interior of the foam, whereby a sandwich foam sheet structure can be provided.

It is a concept of this invention to provide apparatus for thorough blending of a thermoplastic charge with an expanding agent, injected directly into the barrel of the extruder, for temperature control of the foamable mass and for temperature control both during and after foaming. The apparatus comprises, successive treatment chambers or zones, disposed in end-to-end relation and including the extruder followed by a cooling, agitating and mixing zone and an unagitated cooling zone. After treatment in these zones, the thermoplastic issues from a die, and the temperature of the extrudate is precisely controlled to assure desired cell development during formation, stretching and orientation of the sheet.

A further object of this invention is to provide improved foam sheeting by controlled cooling of at least one surface of the extrudate. This is accomplished, as will hereinafter be disclosed, by controlling the surface temperatures of the foaming material as it issues from the die lip, and thereafter by coolingone or both surfaces of the sheet to toughen the sheet surface and provide a high gloss surface skin of greater density than the sheet core. This sheet material is highly suitable for use in making deep draw thermoformed products in which the depth of the draw is as much as 1½ times the diameter of the product.

The above and other objects of this invention will be more readily apparent from the following description and with reference to the accompanying drawings, in which:

FIG. 1 is an overall view showing apparatus embodying this invention for making thermoplastic foam sheet material;

FIG. 2 is a partial, enlarged cross sectional view, showing a portion of the extruder embodying the invention;

FIG. 3 is a partial cross sectional view showing the mixing and cooling zones from the apparatus of FIG. 1;

FIG. 4 is a section on an enlarged scale taken along line 4—4 of FIG. 3;

FIG. 5 is a section taken along line 5—5 of FIG. 3;

FIG. 6 is an enlarged cross sectional view showing a die and temperature control system embodying the invention; and FIG. 7 is a greatly enlarged cross sectional view illustrative of a foam sheet embodying this invention.

In accordance with this invention, where an expanding agent is mixed with a polymer in the extruder barrel, the polymer must be soft enough for complete diffusion of the expanding agent. In the case of general purpose polystyrene, to achieve this result, a temperature of about 400° F. is required to melt the polymer and to make it flowable. From this melt temperature the polymer must be returned to the extrusion temperature, which is critical, since it must be high enough to soften the plastic so it can be expanded by action of the expanding agent, but low enough so that the plastic is sufficiently viscous and coherent to form a fine bubble structure. It is generally recognized that for polystyrene the temperature of the melt at the die lip should be in the neighborhood of 250–275° F. It will thus be realized that fairly precise temperature control is required to reduce the polymer from around 400° F. to about 250° F. In addition, temperature of the sheet, as its cell structure is developing, is also of great importance. To control the sheet formation and cell development, we have provided a temperature control system which regulates the temperature of the foam at the die lip, and in addition, controls the temperature of the sheet in the area between the die and the forming apparatus. For the generation of good quality polystyrene foam, it is important to maintain uniform cooling, since polystyrene foam has a low rate of heat transfer and a low specific heat.

Since this invention includes the continuous mixing of polymer and expanding agent in the extruder propellant feed zone, the design of the extruder screw is important, not only in the vent zone but also in the compression zones, before and after the vent zone. Furthermore, using conventional extruders having length to diameter ratios of about 24:1, it is found that additional mixing of the expanding agent and polymer was beneficial. In continued mixing, however, it is important to avoid additional heating of the polymer by shear. This has been done by developing a low shear agitated mixer, which insures uniform molecular diffusion of the blowing agent in the polymer without excessive shear heating of the thickening polymer. After uniform mixing of the blowing agent and polymer, it is fed through a non-agitating, cooling zone. By the concepts and apparatus herein disclosed and claimed, a system is provided for the continuous production of high grade thermoplastic foam.

Referring in detail to the drawing, in FIGS. 1 and 2 is shown apparatus comprising a plastic processing system embodying this invention. In general the system comprises an extruder 10 including a cylindrical barrel 12 and screw 14. A hopper 16 is mounted to feed thermoplastic material into the extruder barrel and a conduit 18 is provided for injecting expanding agent or propellant directly into the vent, hereinafter called the propellant feed zone of the extruder barrel. A ball check valve 19, closely coupled to the barrel of the extruder, prevents polymer flow into the conduit 18 and if at any time the barrel pressure exceeds the pressure in the conduit 18, the valve 19 closes automatically. Propellant could also be fed into the extruder barrel within the screw itself, the screw being provided with a suitable check valve located at the feed zone.

Extending coaxially from the end of the extruder 10 is a mixing cylinder or chamber 20, also shown in FIGS. 3 and 4. The mixer is an agitating type designed to insure uniform mixing of expanding agent and polymer melt. Following the mixing chamber is a non-agitating cooling cylinder or chamber 22, also shown in greater detail in FIGS. 3 and 5.

A die 24 receives the polymer issuing from the end of the cooling cylinder 22 and is shown in greater detail in FIG. 6 of the drawings.

Foam extrudate issuing from the die lip as a cone is stretched and biaxially oriented by drawing over a cylindrical forming drum 26. The tubular sheet $s$ is then slit into upper and lower webs by the use of stationary knives 28 disposed on opposite sides of the drum 26. From the rear of the forming drum the webs of sheet material are flattened and then fed to S wrap pull rolls, not shown.

The extruder, shown in FIGS. 1 and 2, may be heated by any suitable means, such as by electrical heaters 29 which may be disposed around the barrel, and controlled to maintain the polymer at the desired temperature. The polymer, softened by premixing with a suitable softening agent, such as pentane, is propelled along the extruder barrel from the upper side section to the first compression zone, indicated generally at 30 in FIG. 2. In the first compression zone the root diameter of the extruder screw increases to a maximum diameter $a$ which results in the polymer being melted and compacted in advancing to the propellant feed zone of the extruder, indicated at 32. The propellant feed zone has a substantially smaller root diameter $b$ than the root diameter of the first compression zone 30. The expanding agent is injected into the propellant feed zone and blended with the polymer melt by action of the flights of the extruder screw. The expandable melt is then advanced to the second compression zone, having a root diameter $c$ which is less than the root diameter $a$ within the first compression zone 30. This relationship causes a take away of polymer from the propellant feed zone at a somewhat faster rate than it is supplied by the compression zone 30. There is thus a partially starved condition in the propellant feed zone with resulting pickup by the polymer of the expanding agent or propellant injected through the conduit 18. Although not specifically shown in the drawing, it will be appreciated that the extruder includes, in addition to the compression and vent zones, metering zones in which the root diameter of the extruder screw is of constant diameter. In one preferred operation, the temperature is controlled for polystyrene foam so that the feed and first compression zone are maintained at around 350° F., and the temperature in the propellant feed zone in the neighborhood of 335° F. The polymer melt is generally around 310° F. as it leaves the extruder and enters the mixer 20.

Because of the injection of expanding agent directly into the extruder, it is important further to mix the polymer and expanding agent. This is accomplished by providing in succession a mixing zone or chamber, in which mixing and cooling of the polymer is accomplished followed by a cooling zone in which there is no mechanical agitation of the foamable polymer melt.

The mixer 20 comprises a cylindrical chamber or barrel 36 which has an internal diameter $d$ substantially smaller than the internal diameter of the extruder barrel. A shaft 38 is connected for rotation with the extruder screw 14. A plurality of axially spaced pins 40 extend radially from the shaft 38. This mixer construction insures uniform diffusion and distribution of the blowing agent throughout the polymer. The diameter of the shaft 38 and internal diameter of the cylinder 36 are dimensioned so as to provide a free annular area in the mixer 20 equal to that of the final metering section in the extruder. This insures uniform flow of the polymer from the extruder through the mixing chamber 20. By providing a mixing chamber of substantially smaller diameter than the extruder, the possibility of excessive heating by shear is minimized since the tip speed of the mixer pins 40 is substantially lower than the tip speed of the screw flights in the final metering zone of the extruder. By this arrangement, we have achieved in a continuous process, the processing effect sought conventionally by the use of two separate extruders in which the speed of the second screw is substantially reduced from that of the first.

While the purpose of the mixing and cooling zones is to complete mixing and cooling of the polymer, it is undesirable to effect too rapid a surface cooling of the walls of these chambers, such as by the use of cold water. Because of the relatively low specific heat and low rate of heat transfer of polystyrene, it is essential that cooling be gradual and uniform throughout the entire mass.

After thorough mixing in the mixing chamber, the expandable polymer melt is advanced by the extruder screw into the cooling chamber or zone 22. This chamber comprises a cylindrical barrel 42 having the same diameter as the barrel 36. A plurality of open ended metal pipes, or tubes, 44 extend transversely through the barrel 42, the diameters of the tubes 44 are selected to provide a free space between the tubes and the wall of the barrel 42, which is approximately equal to the annular area around the extruder screw. The tubes 44 are oriented with their axes alternately at right angles to each other. The polymer is thus advanced through the cooler zone 42 at the same speed as it is advanced by the extruder and the melt polymer flows over, under and around the tubes 44 which serve to reduce uniformly the temperature of the polymer to further blend the polymer and blowing agent with a minimum of shear. While breaker plates may be used, they must have sufficient open area so that excessive back pressures are not developed. The cross sectional area of the cooler was made equal to that of the discharge area of the screw to prevent stagnation of the material, and to make the throughput equivalent to that delivered by the final metering flights of the screw, thus achieving for a given extruder screw speed a cooling system balance effective over a range of extruder screw speeds from 40–80 r.p.m.

The die 24, shown in detail in FIG. 6, comprises a die body 50. A die head 52 is bolted to the outer end of the die body 50 by means of a plurality of circumferentially spaced bolts 54. A ring 58 is fitted onto the die head 52 and serves with a channel in the die head to provide an annular chamber 60 within the die head. The chamber has a circular opening 62 disposed within approximately .030″ of the die lip. A temperature controlled fluid, under pressure, is supplied to the chamber 60 by tube 64 fitted into the ring 58. Similarly an annular chamber can be fitted to the conical die plug 70 to act on the inside surface of the issuing sheet.

Disposed in the die body 24 is a mandrel 66 on which is formed a choke ring 68. A cone shaped plug 70 is fitted onto the outer end of the mandrel 66 and an axially disposed rod 72 extends from the center of the mandrel 66 and the die head 70, outwardly from the end of the die face 74. The rod 72 provides a support for the forming drum 26 in predetermined spaced relation to the end of the die face.

The temperature of the die face 74 is controlled by means of a fluid conducting tubing 76 carried on a disc or plate 78 and disposed in surface contact with the face 74 of the die plug 70. Suitable fluid, such as cooling air may be circulated through the tubing 76 to control the temperature of the extrudate at the die lip. Further temperature control of the extrudate is provided by means of a cooling ring 80 disposed about the die head 52 and supplied with a suitable cooling fluid, such as air. The cooling ring, as shown, is in the form of a tube with a plurality of circumferentially spaced holes or perforations 82. The diameter of the ring 80 is sufficiently large so that air issuing from the perforations 82 impinges on the outer surface of the conical sheet s at a substantial distance from the die lip. As a result, there is achieved a delayed cooling of the outer surface of the sheet whereby it is allowed to stretch while hot as it is drawn from the die lip toward the outer surface of the forming drum.

The forming drum, mounted on the rod 72, is a cylindrical drum having a polished metallic surface with a rounded leading edge 84, cooled by circulation of a fluid, such as water, through a pipe 86 disposed under and in contact with the edge 84. The temperature of the water circulated in the pipe 86 is sufficiently low to set or "freeze" the thermoplastic sheet so as to prevent any further orientation of the sheet as it is drawn over the surface of the drum, cut and wound on rolls. Additional temperature control of the sheet s is provided for by a plurality of circumferentially spaced perforations 88 extending through the wall of the drum 26, which may be connected to a substantial source of air pressure. When air pressure is so supplied to the drum, it is directed onto the inner surface of the sheet s. The temperature of this air may be approximately the same as the air provided by the cooling ring 80. The pressured air may escape around the forming drum providing lubrication. For polystyrene foam, we have found that an air temperature from the cooling ring and drum of around 80° F. produces sheet material characterized by apparent skins forming the surfaces of the material. As shown in FIG. 7, sheet material embodying this invention consists of an interior core 90 having larger and more spherical cells than at the surfaces. The cells at the surface, as shown generally at 92, are generally flatter and have cell wall thickness on the order of 50–100% greater than the walls of the cells in the core of the sheet.

The apparent presence of skins on foams embodying this invention result from higher concentration of polymer near the surfaces of the sheet, together with the elongation of the cells as the sheet is stretched both longitudinally and transversely as it is formed. Cooling of the outer surfaces of the sheet, as described above, inhibits the cell development whereby the polymer at surfaces of the sheet sets and is cold stretched. Meanwhile, the warmer polymer within the body of the sheet allows continued expansion of the cells which results in a novel sandwich type foam.

In general, the foams made by this process are characterized by substantially higher density for a given thickness than conventional foams and by highly reflective surfaces. While the foams appear somewhat brittle, it has been unexpectedly found that they can be more readily thermoformed to produce useful articles than conventional uniform foams.

By setting the surfaces of the sheet material, as described, foam sheeting made by this process is more highly oriented in the machine and transverse directions. This results in higher tensile strengths for sheets of the same gauge, both longitudinally and transversely of the web. Standard tensile strength tests were made using a 50 mil, 10 pound per cubic foot sandwich foam embodying this invention, and a conventional uniform foam having 100 mil thickness and density of 5 pounds per cubic foot. Tests were conducted longitudinally and transversely of the web and it was found that the uniform foam had a longitudinal tensile strength of 350 p.s.i. and transverse strength of 330 p.s.i. The foam embodying the invention, tested in the same manner, and having the same polymer content as the uniform foam was found to have a longitudinal strength of 790 p.s.i. and a transverse strength of 670 p.s.i.

The thermoforming characteristics of foam embodying this invention were established by using conventional foam of uniform cross sectional characteristics, and the sandwich foam embodying this invention. Specimens of both foams were heated with a radiant heating apparatus for periods varying from 15 to 165 seconds. Sheets were formed using a cup-like cavity having an opening or mouth of 3 inches and a depth of 4½ inches. Thermoforming was carried out using various methods including vacuum forming, match molding, and combinations thereof. Approximately 100 specimens of conventional 100 mil, 5 pound per cubic foot foam of uniform cross section were compared with a like number of 50 mil, 10 pound per cubic foot density sandwich foam, used to obtain cups of equal overall weight and polymer content.

Of the approximate 100 specimens of the uniform foam tested, not heating and forming conditions were found which produced commercially suitable thermoformed products.

In contrast, the 50 mil, 10 pound density, sandwich foam, made as described, repeatedly produced cups of excellent commercial quality.

In the specific die construction which has proved suitable for use in carrying out this invention, the choke ring 68 is dimensioned so that the annular space between the choke ring and the die wall is approximately .030″, and the distance from the feed of the polymer to the choke ring is on the order of 4¾″. This provides uniform feed and pressure to the rear of the choke ring. From the choke ring outwardly, the internal cross sectional thickness for the polymer melt is approximately ⅜″ and the die lip land 90 is slightly less than ¹⁄₁₆″.

As the polymer issues from the die lip its temperature and relatively dense surface skin is controlled by air flowing from the opening 62 of the annular chamber 60. The temperature of this air is such that when it impinges on the sheet it has a temperature slightly lower than the polymer. Usually if room temperature air is introduced to the chamber 60, sufficient heat will be picked up from the die head 58 to raise the temperature to the desired level. In the manufacture of polystyrene, we have found that an air temperature from opening 62 of approximately 225–250° F. produces excellent results. The temperature of the opposite surface of the sheet s is controlled by die plug cooling which as described may be accomplished by circulating room temperature air through tube 76 or by an internal air or chamber similar to 60; this maintains the outer edge portion of the die plug at approximately 250° F. Of course, if desired to obtain a foam having only one tempered surface, cooling would be applied to only one surface of the foam. The use of these temperature control means at the die lip insures excellent foam cell development and minimizes the possibility of broken surface cells, wrinkles and corrugations being developed in the sheet material as it expands on issuing from the die. The careful temperature control at the moment of issuance avoids broken surface cells; but in particular it produces higher density surface which gives improved thermoforming.

As the sheet expands additional temperature control is provided in the form of warm air at approximately 80° F. issuing from the ring 80 and the forming drum perforations 88. With this second stage cooling, the sheet surfaces are solidified before reaching the forming drum 26. Prior to this solidification, the sheet is hot stretched from the die lip outwardly toward the forming drum. After cooling by 80° air, the sheet is biaxially oriented as it is drawn over the leading edge 84 of the forming drum where the sheet is cooled to "freeze" it to its final form. There is thus substantially no further forming or orientation. A few seconds should be allowed for travel from the cooling ring 80 to the slitting knives 28. We have found that a travel time of about 3–5 seconds on the drum allows sufficient cooling of the sheet so that it can be properly cut with stationary blades. An additional air cooling ring, not shown, may be disposed in spaced relation around the leading edge of the drum 26 to further insure "freezing" of the sheet at this point.

After final cooling, the sheet cylinder is slit and separated into two webs w of foam sheet material which are wound up on rolls.

Having thus disclosed this invention, what is claimed is:

1. Thermoplastic foam sheet comprising a cellular material having an overall density of from 10 to 30 pounds per cubic foot and in which the cells forming the surfaces of the sheet are generally flatter and have a wall thickness on the order of 50–100% greater than the wall thickness of the cells in the core of the sheet.

2. Apparatus for the manufacture of thermoplastic foam sheet material comprising an extruder, means for feeding polymer into said extruder, means for introducing an expanding agent into said extruder, a low shear mixing and cooling chamber disposed to receive the output of said extruder, followed by a substantially non-shear cooling chamber, and a die disposed to receive the output of said substantially non-shear cooling chamber.

3. Apparatus for the manufacture of thermoplastic foam sheet material as set forth in claim 2 in which said low shear mixing and cooling chamber and said substantially non-shear cooling chamber comprise conduits coaxially disposed relative to the extruder barrel and of smaller internal diameter than said barrel, and wherein said substantially non-shear cooling chamber includes a plurality of axially spaced tubes radially extending through the conduit forming the substantially non-shear cooling chamber, said tubes being adapted to cool and blend, substantially without shear, the polymer melt moved thereby.

4. Apparatus for the manufacture of thermoplastic foam sheet material as set forth in claim 3 in which said low-shear mixing and cooling chamber includes a mixer comprising a shaft extending from the end of the extruder screw with a plurality of axially spaced radially extending pins substantially shorter than the radius of the final stage of the extruder screw.

5. Apparatus for the manufacture of thermoplastic foam sheet material as set forth in claim 2 wherein said low-shear mixing and cooling chamber and said substantially non-shear cooling chamber have open cross sectional areas approximately equal to the annular cross sectional area in the extruder.

6. Apparatus for the manufacture of thermoplastic foam sheet material as set forth in claim 2 in which said die is a tubular sheet forming die and includes means for controlling the temperature of the extrudate at the die lip, and a forming drum disposed in coaxially spaced relation to said die, and means for severing said tubular sheet to provide webs of sheet foam.

References Cited

UNITED STATES PATENTS

| | | | |
|---|---|---|---|
| 2,461,630 | 2/1949 | Cozzo | 18—14 |
| 2,669,751 | 2/1954 | McCurdy et al. | 264—53 |
| 3,094,449 | 6/1963 | Sisson | 264—53 XR |
| 3,151,192 | 9/1964 | Jacobs et al. | 264—53 |
| 3,194,864 | 7/1965 | Richie | 264—51 |
| 3,221,954 | 12/1965 | Lux | 264—45 XR |
| 3,275,731 | 9/1966 | Kosinsky. | |
| 3,290,198 | 12/1966 | Lux et al. | 264—51 XR |
| 3,299,192 | 1/1967 | Lux | 264—48 |
| 3,310,617 | 3/1967 | Dygert et al. | 264—53 |
| 3,311,681 | 3/1967 | Cherney et al. | 264—53 XR |

OTHER REFERENCES

The Patterson-Kelley Manual No. 700-A, © 1959, Process Heat Exchanger Division, p. a–2: "In the Floating Head Pull-Through Bundle Type."

JAMES A. SEIDLECK, Primary Examiner.

P. E. ANDERSON, Assistant Examiner.